July 4, 1967  C. O. OLDENKOTT  3,329,190
LOCK WASHER AND LOCK WASHER ASSEMBLY
Original Filed Nov. 26, 1965
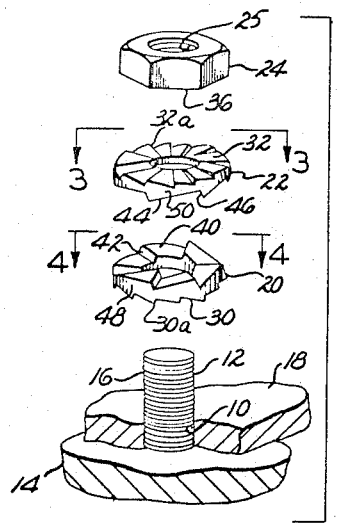
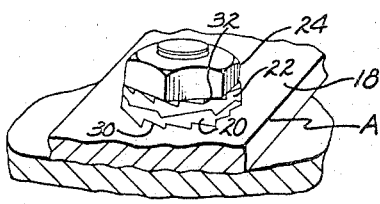
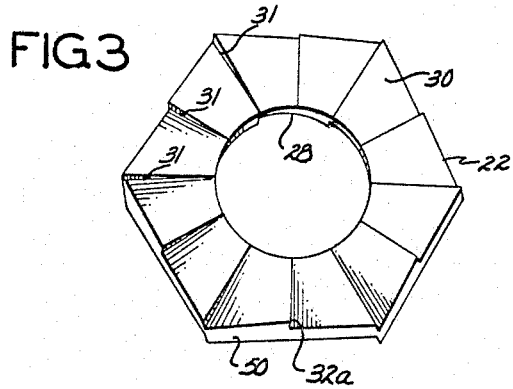
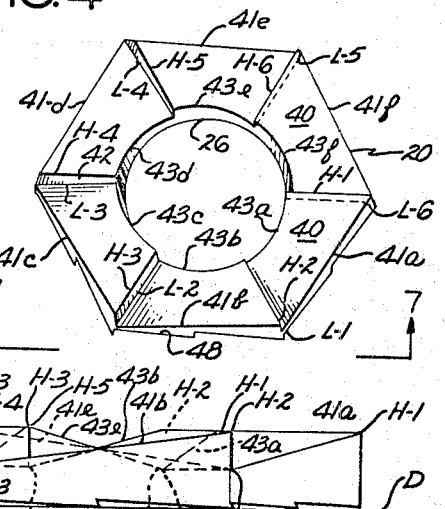
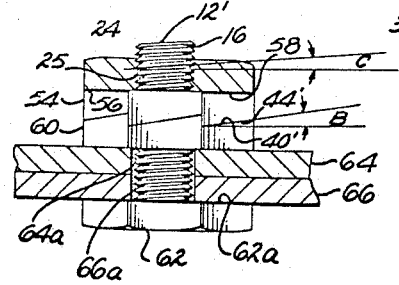
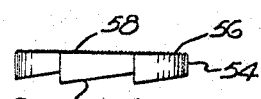
INVENTOR.
CARL O. OLDENKOTT
BY William C. Babcock
ATTORNEY United States Patent Office 3,329,190
Patented July 4, 1967

3,329,190
LOCK WASHER AND LOCK WASHER ASSEMBLY
Carl O. Oldenkott, 213 N. Evergreen, Anaheim, Calif. 92805
Continuation of application Ser. No. 509,972, Nov. 26, 1965. This application Aug. 30, 1966, Ser. No. 576,161
1 Claim. (Cl. 151—35)

This application is a continuation of my application Ser. No. 509,972, filed Nov. 26, 1965, entitled Lock Washer and Lock Washer Assembly, now abandoned.

The present invention relates generally to mechanical fasteners, and more particularly to a lock washer and lock washer assembly for locking a nut on a stud bolt or through bolt.

A major object of the present invention is to provide a lock washer of simple design, which together with another washer of the same structure, may, when both washers are disposed in an encircling position on an externally threaded elongate member, cooperatively hold a nut in a fixed, non-rotatable position on the member. Another object of the invention is to supply a lock washer assembly which includes conventional nuts and studs or through bolts wherein the locking function is attained by means of the particular configuration of the locking washers.

Yet another object of the present invention is to furnish lock washers which are adapted to be assembled in pairs to perform the function of locking a nut on a stud or through bolt when the nut is merely rotated into place in pressure contact with an external surface of one of the lock washers.

Still another object of the present invention is to furnish a pair of lock washers having opposed cooperating cam faces which function when the lock washers are assembled to prevent rotation of a nut in an unlocking direction during the normal intended use of the lock washer assembly.

A further object of the invention is to supply a lock washer, on one side of which cam faces are formed that can cooperate with cam faces formed on a duplicate lock washer, with the side of each lock washer opposite that on which cam faces are formed having serrations or other means which can operatively engage adjacent metal surfaces, such as the bottom or lower surface of a nut, the top surface of a sequence of plates, or other members disposed between the nut and the base of a stud bolt or the head of a through bolt, as the case may be, to effect locking engagement between the nut and stud bolt or through bolt on which the lock washers are mounted.

A still further object of the present invention is to provide a lock washer assembly having cooperating cam faces which are sufficiently within a range of angularity that a nut may be locked on a stud bolt or through bolt when the nut is rotatably brought into its locking or engaging position.

Yet another object of the invention is to provide lock washers having opposed matching flats on the outer surfaces thereof, which are assembled in pairs, which flats cooperatively receive a wrench whereby the washers and nut are adapted to be removed from the stud out of a fully locked position.

Still a further object of the invention is to provide a lock washer intended for paired assembly and having a plurality of stop shoulders formed on the engaging cam surfaces thereof, which shoulders upon mutual contact, cooperatively arrest relative rotation between the two lock washers during the time the nut is screwed onto a stud bolt or through bolt, as the case may be.

These and other objects and advantages of the present invention will become apparent from the following description of a first and alternate forms thereof, and from the accompanying drawing illustrating the same, in which:

FIGURE 1 is an exploded perspective view of the first form of the invention prior to assembly;
FIGURE 2 is a perspective view of the invention after assembly;
FIGURE 3 is a top plan view of one of the lock washers taken on the line 3—3 of FIGURE 1;
FIGURE 4 is a top plan view of the lowermost lock washer shown in FIGURE 1, taken on the line 4—4 thereof;
FIGURE 5 is a side elevational view of a through bolt with two of the lock washers mounted thereon and resting on the uppermost surface of two rigid members through which the bolt extends, with the nut for the bolt being in contact with the uppermost washer;
FIGURE 6 is a side elevational view of the alternate form of lock washer; and
FIGURE 7 is an enlarged side elevational view of the first form of washer taken on the line 7—7 of FIGURE 4.

With continuing reference to the drawing for the general arrangement of the invention, it will be seen that a stud bolt 12 projects upwardly from a stud base 14 and is rigidly connected thereto. External threads 16 are formed on the stud bolt 12, which bolt extends through a bolt hole 10 in a rigid plate A that rests on the upper surface of the base 14. The upper surface 18 of plate A is adapted to have a lower lock washer 20 rest thereon, as may best be seen in FIGURE 2, and an upper lock washer 22 rests on top of washer 20. A nut 24 is in locked operative position above washer 22.

A central opening 26 is formed in the lower washer 20, and a central opening 28 in the upper washer 22 to permit these washers to be slid over the stud bolt 12 from the position shown in FIGURE 1 to occupy the position shown in FIGURE 2. The openings 26 and 28 are just large enough to permit the easy mounting of washers 20 and 22 on the stud bolt 12 prior to engagement of the stud bolt by the nut 24. Nut 24 may then be placed in engagement with stud bolt 12, with the interior threads 25 of the nut (FIGURE 5) engaging the threads 16 on the outside of stud bolt 12. Thereafter, clockwise rotation of nut 24 (FIGURE 2) will lower it on stud bolt 12 due to engagement between threads 25 and 16 until the nut is in a locked position.

Serrations 30 are formed on the lower face of washer 20, and serrations 32 are formed on the upper face of washer 22, which consist materially in maintaining the nut 24 in a locked, non-rotatable position on stud bolt 12. As nut 24 is lowered on stud bolt 12 in the manner described, it forces lock washers 20 and 22, plate A, and the stud base 14 into compressive engagement, thereby causing serrations 30 to engage and bite into the upper surface 18 of the plate, and also causing serrations 32 to engage and bite into the lower surface 36 of the nut. Also, the engagement of serrations 30 with the top surface 18 of plate A serves to hold lower washer 20 against further rotation, while the engagement of serrations 32 with the lower surface 36 of nut 24 causes washer 22 to rotate in a clockwise direction with nut 24 until stopped by coming into contact with stop shoulders on the washers, as will be described hereinafter.

Lock washer 20 has a number of sloping, circumferentially extending cam faces 40 formed on one side thereof, which at the junctions thereof define stop shoulders 42. On one side of washer 22 a number of sloping, circumferentially extending cam faces 44 are formed, which at the junctions thereof define stop shoulders 46. When the stop shoulders 42 and 46 are in contact they serve to arrest rotation between the washers 20 and 22 while nut 24 is being screwed onto stud bolt 12, as mentioned hereinabove, and the contacting cam faces 40 and 44 serve to prevent rotation of nut 24 relative to the stud bolt 12 in a counterclockwise or unlocking direction after the nut has been screwed into locked or operative engagement with the plate A through the other elements of the lock washer assembly; namely, the stud bolt, the washers, and the plate.

The detailed structure of lock washer 20 may best be seen in FIGURE 7, which is preferably hexagonal to provide pairs of opposed flats 48 which may be engaged by a wrench (not shown) for reasons to be explained in detail hereinafter.

Each of the body shoulders 42 is defined by a lower, radially extending line and an upper radially extending line. For clarity of description and illustration herein the upper radial lines are identified in FIGURES 4 and 7 by the notations H–1 to H–6 inclusive, and the lower radial lines L–1 to L–6 inclusive.

Inasmuch as the lock washer 20 is hexagonal, the spacing between the radial lines H–1 to H–6 and lines L–1 to L–6 is 60°. For simplicity of illustration, the body shoulders 42 are shown in FIGURES 4 and 7 as lying in vertical planes, but actually, when the lock washer 20 is fabricated by a pressure impacting operation, the body shoulders are not formed at a vertical plane, but slope upwardly at an angle. If the washer 20 as shown in FIGURE 7 is considered as resting on a flat surface D, each of the radially extending lines H–1 to H–6 inclusive will lie in a plane above surface D and parallel thereto. Likewise, each of the lower radial lines L–1 to L–6 inclusive will also be disposed above surface D and parallel thereto.

The configuration of each cam surface 40, as may best be seen in FIGURES 4 and 5, is a 60° circumferentially extending segment of the washer 20, with each segment having a straight outer boundary line 41 and a curved inner boundary line 13. The configuration of one of the cam faces 40 is best shown in FIGURE 7 wherein it will be seen that one of the outer boundary lines 41, more specifically designated by the notation 41a, extends from the outer extremity of line H–1 to the outer extremity of line L–1. The balance of the boundary lines are identified as 41b, 41c, 41e and 41f in FIGURES 4 and 7. Also in the same cam segment, an inner boundary 43, further identified as 43a, extends from the inner extremity of line H–1 to the inner extremity of line L–1. The balance of the inner boundary lines are identified by the notations 43b to 43f as shown in FIGURES 4 and 7. The outer boundary line 41a is of substantially greater length than the inner boundary line 43a, but both of these lines originate at the line H–1 which is at a fixed uniform elevation above the surface D and terminate on the line L–1 which is also at a fixed uniform elevation above surface D. Thus, the outer boundary line 41a will be at a lesser angle relative to surface D than the boundary line 43a, as may be clearly seen in FIGURE 7. This is also true of each boundary line 41b to 41f relative to its corresponding inner boundary line 43b to 43f.

This description of the cam face 40 lying between the radially extending lines H–1 and L–1 is equally applicable to the balance of the cam surfaces 40 shown in FIGURES 4 and 7. The cam surfaces 44 shown on the upper lock washer 22 in FIGURE 1 are matching duplicates of the cam surfaces 40. When lock washers 20 and 22 are rotated relative to one another, the cam surfaces 40 and 44 are finally disposed in the position shown in FIGURE 2.

After nut 24 has been made up on bolt 12 (FIGURE 2), any attempt to remove it, either by application of a rotational force thereto in a counter clockwise direction or by imparting vibration thereto, will be resisted by the action of the two lock washers 20 and 22. When the nut 24 is made up, it is brought into pressure contact with the radial serrations 30 of the upper lock washer 22, and these serrations (FIGURE 3) are so formed as to permit rotation of the nut in a clockwise direction relative thereto, but resist rotation of the nut when it is rotated in a counter-clockwise direction relative thereto. When such counter-clockwise rotation is attempted, the serrations 32, as best illustrated in FIGURE 2, tend to bite into the metal of the under surface 36 of nut 24. Thus, counter-clockwise rotation of nut 24 is resisted by the nut due to the ability thereof to rotate relative to the serrations 32.

After nut 24 is screwed on bolt 12, the cam faces 40 and 44 are in engagement and the faces 44 slide relative to the cam faces 40 until the body shoulders 42 and 46 are in abutting contact. Should any attempt be made to rotate the nut 24 and the washer 22 relative to the bolt 12, the cam faces 44 will slide upwardly on the cam faces 40, whereby the serrations 32 on washer 22 are forced into greater pressure contact with the under surface 36 to hold the nut in a fixed position on the bolt.

The lower washer 20 cannot rotate relative to the surface 18 of plate A, for when the nut 24 is made up, the serrations 30 thereof are brought into pressure contact with the plate whereby due to their configuration, the serrations tend to dig into the plate. After positive engagement of the serrations 30 and plate A, the serrations tend to resist rotation of washer 20 in a counter-clockwise direction so long as downward force is exerted on the washer.

The plate A (FIGURE 2) rests on the base 14 and is not rotatable relative thereto. For the cam faces 40 and 44 to maintain the serrations 30 and 32 in pressure contact with the surface 18 of plate A and surface 36 of nut 24, it is necessary that the angle of these cam faces relative to the horizontal be such that as the upper lock washer 22 and nut 24 concurrently rotate relative to the lower washer 20, the upper washer will move upwardly per degree of rotation at a faster rate than the nut on bolt 12. Thus, the angular positioning of the cam faces 40 and 44 must be at an angle B (FIGURE 5) that is greater than angle C which through threads 16 of a through bolt 12' make relative to the horizontal. If the angle B is less than the angle C, the nut 24 would upon concurrent rotation with washer 22 move upwardly faster than the washer 22, and would be disengaged from the serrations 32. After disengagement of nut 24 from serrations 32, it is free to be unscrewed from bolt 12.

To disengage the nut 24 from the stud bolt 12 or through bolt 12' by vibration after it has been made up thereon, there must be some relative movement of the nut and the upper washer 22 relative to the lower washer 20. Such relative movement of the nut 24 and washer 22 normally would only be possible if there has been an elongation of the bolt 12 or 12'. When a nut 24 is made up on either a stud bolt 12 (FIGURES 1 and 2) or a through bolt 12' (FIGURE 5) the bolt is subjected to tension.

Such tension, as well as any additional tension that may be placed on the bolt due to loading, may, after a prolonged period of time cause the metal of the bolt to creep and permanently deform in the direction in which the tensional force is applied. The degree of creep in various metals and alloys is dependent upon the temperature at which the metal is stressed, the magnitude of the stress, and whether the stress is intermittently or constantly applied. If the stud bolt 12 or through bolt 12' tends to elongate after the nut 24 has been made up thereon, as shown in FIGURES 2 and 5, relative movement between the upper washer 22 and lower washer 20 would be possible. However, if after such elongation, and assuming the bolt, nut 24 and washers 20 and 22 are subjected to vibration, rotation of the nut could only occur with concurrent rotation of the washer 22. As the washer 22 would tend to rotate in a counterclockwise direction as illustrated in FIGURE 2, the cam faces 44 would slide relative to cam faces 40, and the nut 24 and upper washer 22 would be moved upwardly on bolt 12 or 12' and held in locked position thereon. If the vibration is of such nature that the nut 24 and upper washer 22 remain stationary on the elongate bolt 12 or 12', the lower washer 20 due to the configuration of the serrations 30, can only rotate in a clockwise direction. As such clockwise rotation of the lower washer 20 takes place, the cam faces 40 move relative to the cam faces 44. A downward force imparted to washer 20 due to the rotational movement relative to washer 22 that tends to cause the serrations 30 to bite into the surface 18 of plate A or the upper surface of plate 64 to assume a new position relative thereto, and in which new position the nut 24 is locked in fixed position relative to bolt 12 or 12'. Thus, it will be seen that even when the bolt 12 or 12' elongates as a result of loading and is subjected to vibration, due to such vibration the lock washers 20 and 22 continue to cooperatively exert a locking effect on nut 24.

Obviously, a number of modifications of the lock washer concept just described are possible. As an example, one alternate form of lock washer 54 may be employed, as shown in FIGURE 6, which is identical to washer 22, other than that the serrations 32 are dispensed with, and instead a flat upper surface 56 is provided which is roughened to furnish a number of small, upwardly extending protuberances 58 that may be forced into biting engagement with the under surface 36 of nut 24. If the alternate form is used, another washer 60 (FIGURE 5) would be provided which would be the same as washer 20 except that the serrations 30 thereon would be eliminated and a plane surface substituted therefor that has small protuberances 58 projecting therefrom. Washer 60 would engage washer 54 and function in the same manner as washer 20 previously described. The two washers 54 and 60 have cam faces 44' and 40' of the same configuration as the cams 44 and 40 as shown in FIGURE 1.

The alternate form of the washer is shown mounted on a through bolt 12' which has a head 62, and two plates 64 and 66 are held in abutting contact by this bolt which extends through bores 64a and 66a formed therein. This alternate form of the invention operates in precisely the same manner as the preferred form thereof shown in FIGURES 1 and 2 and accordingly the use and operation of the alternate form need not be described.

If the plate A or members 64 and 66 are steel or iron, the lock washers 20 and 22 would preferably be formed of a ferrous metal, and at least the serrated portions 30 and 32 heat treated to a Brinell hardness greater than that of plate A, member 64, and nut 24. In addition, it has been found that the washers 20 and 22 can be fabricated from a non-ferrous material such as aluminum, or an alloy thereof, or from a polymerized resin. When a non-ferrous material or polymerized resin is utilized in the fabrication of washers 20 and 22, the serrations 30 and 32 do not dig in or become embedded in the material of nut 24, plate A, or member 64, but are in binding, frictional engagement therewith. The serrations 30 (FIGURE 7) define radially extending teeth 30a that permit clockwise rotation of the washer 20, but which bite into the surfaces 18 or upper surface of member 64 when the washer is in pressure contact therewith and a rotational force is applied to the washer is in a counter-clockwise direction. Serrations 32 have teeth 32a that are similar to teeth 30a, and tend to bite into the lower surface 36 of nut 24 when in pressure contact therewith, and when the nut attempts to rotate in a counter-clockwise direction relative to washer 22. From the configuration of teeth 30a, it will be seen that they will resist counter-clockwise direction of washer 20 relative to surface 18 or the upper surface of member 64, even if the washer is formed from a soft metal such as aluminum or a material such as a polymerized resin.

As previously mentioned, the washer 20 is formed with a number of pairs of flats 48. Also, washer 22 is preferably formed with a number of pairs of flats 50. The flats 48 and 50 present exterior surfaces lying in the same vertical plane when the nut 24 is made up as shown in FIGURE 2, and these flats are concurrently engageable by a wrench. Under some conditions, depending upon the toughness of the teeth 30a and 32a and the type of surface with which they come into pressure contact, it is possible to loosen a made-up nut 24 by concurrently rotating the washers in a counter-clockwise direction. However, if washers 20 and 22 are formed from a hard material such as steel, with the teeth 30a and 32a being sharp, it is impossible to unscrew the nut 24 from bolts 12 or 12' if it has been tightly made-up thereon. To further prevent removal of a nut 24 from a through bolt 12', the head 62 may be disposed in a recesss (not shown) formed in the lower surface of lower member 66, or the inner face 62a of the head may be roughened or provided with serrations (not shown), or the like to positively or frictionally grip the lower surface of member 66 when in pressure contact therewith.

The washers 20 and 22 previously described have substantially the same transverse cross section as the nut 24 with which they will be used, and the washers and the nut having the same number of external wrench-engageable surfaces that are alignable with one another, and thus permit a single wrench to be used to disengage the washers 20 and 22 and nut 24 from the threaded member on which they are disposed.

The inclined mating surfaces of each washer extend entirely over one side thereof, and extend radially from the outermost edges of the washer to a centrally disposed opening therein, as shown in FIGURES 1 and 7. Each inclined mating surface has an inner edge which forms an angle relative to a plane at right angles to the central axis of said washer greater than the angle of the threads on the threaded member relative to the longitudinal axis thereof. The outer edges of each of the wrench-engageable surfaces may be less than the angle of the inner edges, if so desired.

The operational advantages of the washers 20 and 22 disclosed and claimed herein may be summarized as follows:

(1) Washers 20 and 22 can be of minimum thickness, for only the edges of the inclined surfaces thereon adjacent the opening therein need be of an angle greater than that of the threads on the threaded member 12.

(2) External surfaces of the washers are automatically aligned in co-planar relationship with the external surfaces of the nut 24 with which the washers 20 and 22 are used, and when the washers are placed on a threaded member 12 with the inclined surfaces thereof in abutting contact.

(3) All portions of the washers 20 and 22 are subjected to substantially the same force when the nut 24 with which they are used is tightened on a threaded member 12.

(4) Washers 20 and 22 and nut 24 can be unscrewed as a unit from a threaded member 12 on which they are mounted by use of a single wrench.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claim.

I claim:

In combination with a nut having a plurality of wrench-engageable, angularly disposed external surfaces and a threaded member engageable by said nut, a pair of identical lock washers of the same transverse cross section as that of said nut which cooperate with each other to hold said nut in a non-rotatable position on said threaded member when said threaded member extends through a bore formed in an element such as a sheet, each of which lock washers has one end face with the same number of circumferentially spaced, radially extending rectangular body shoulders of uniform height as the number of said angularly disposed surfaces on said nut, which shoulders lie in planes that contain the central axis of said washers and extend through the corners of said washers defined by said angularly disposed surfaces, with a like number of inclined surfaces on each of said end faces, each which inclined surfaces extends circumferentially from the top of one of said body shoulders to the bottom of that one of said body shoulders next adjacent thereto and radially from the outermost portion of said washer to said opening therein, with the edge of each of said inclined surfaces adjacent said opening forming an angle relative to a plane at right angles to the central axis of said washer that is greater than the angle of the threads on said threaded member relative to the longitudinal axis thereof, said washers being mounted on said threaded member with the inclined surfaces on one washer being in abutting contact with the inclined surfaces on the other washer, and the end faces of said washers opposite those on which said inclined surfaces are defined having a plurality of circumferentially spaced serrations formed therein which extend radially from said opening to the outer edges of said washers, which serrations are of a hardness greater than that of the material defining said element and said nut so that said serrations are at least partially embedded in said nut and element when said nut is tightened on said washers, which washers have the same number of external, angularly disposed surfaces as said nut with said external surfaces of said washers and said surfaces of said nut being in co-planar alignment to permit said nut and washers to be concurrently fripped as a unit when said nut is being unscrewed from said member, with the outer edge of said inclined surfaces on said washer being at an angle relative to the side thereof on which said serrations are formed that is less than the angle of the threads on said threaded member.

References Cited

UNITED STATES PATENTS

| | | | |
|---|---|---|---|
| 1,107,792 | 8/1914 | Houston | 151—35 |
| 2,271,732 | 2/1942 | Chappuis | 151—35 |

FOREIGN PATENTS

| | | |
|---|---|---|
| 684,466 | 11/1939 | Germany. |
| 6,425 | 5/1888 | Great Britain. |
| 514,923 | 11/1939 | Great Britain. |

CARL W. TOMLIN, *Primary Examiner.*

R. S. BRITTS, *Assistant Examiner.*

UNITED STATES PATENT OFFICE
CERTIFICATE OF CORRECTION

Patent No. 3,329,190                                 July 4, 1967

Carl O. Oldenkott

It is hereby certified that error appears in the above numbered patent requiring correction and that the said Letters Patent should read as corrected below.

Column 1, line 12, after "abandoned" insert -- , which application is in turn a continuation-in-part of my application Serial No. 261,954, filed Mar. 1, 1963, entitled Lock Washer and Lock Washer Assembly, now abandoned --.

Signed and sealed this 11th day of February 1969.

(SEAL)
Attest:

Edward M. Fletcher, Jr.                              EDWARD J. BRENNER

Attesting Officer                                         Commissioner of Patents